(12) United States Patent
Cimatti et al.

(10) Patent No.: US 8,297,141 B2
(45) Date of Patent: *Oct. 30, 2012

(54) TRANSMISSION FOR A ROAD VEHICLE WITH HYBRID PROPULSION

(75) Inventors: Franco Cimatti, Via Gaiato (IT); Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,603

(22) Filed: Nov. 18, 2010

(65) Prior Publication Data

US 2011/0184599 A1    Jul. 28, 2011

Related U.S. Application Data

(63) Continuation of application No. 12/841,057, filed on Jul. 21, 2010.

(30) Foreign Application Priority Data

Jul. 21, 2009  (IT) .............................. BO2009A0465
Nov. 18, 2009  (IT) .............................. BO2009A0752

(51) Int. Cl.
  *F16H 3/08*    (2006.01)
(52) U.S. Cl. ........................................................ 74/330
(58) Field of Classification Search .................... 74/330, 74/333, 340
  See application file for complete search history.

(56) References Cited

U.S. PATENT DOCUMENTS

| | | | |
|---|---|---|---|
| 6,634,247 B2 | 10/2003 | Pels et al. | |
| 7,462,121 B2 * | 12/2008 | Janson et al. | 475/5 |
| 7,611,433 B2 * | 11/2009 | Forsyth | 475/5 |
| 8,043,187 B2 * | 10/2011 | Yang | 475/218 |
| 2002/0088291 A1 * | 7/2002 | Bowen | 74/339 |
| 2003/0196503 A1 * | 10/2003 | Kobayashi | 74/333 |
| 2006/0130601 A1 * | 6/2006 | Hughes | 74/340 |
| 2007/0022835 A1 * | 2/2007 | Kilian et al. | 74/340 |
| 2008/0087487 A1 | 4/2008 | Agner et al. | |
| 2008/0194369 A1 | 8/2008 | Boutou et al. | |
| 2009/0023529 A1 | 1/2009 | Sanji et al. | |
| 2009/0175742 A1 | 7/2009 | Grethel et al. | |
| 2011/0017015 A1 | 1/2011 | Cimatti et al. | |

FOREIGN PATENT DOCUMENTS

DE  4204384 A1  8/1993

(Continued)

OTHER PUBLICATIONS

"Italian Application Serial No. BO2009A000752, Search Report dated Apr. 16, 2010", 2 pgs.

(Continued)

*Primary Examiner* — Ha D. Ho

(74) *Attorney, Agent, or Firm* — Schwegman, Lundberg & Woessner, P.A.

(57) ABSTRACT

Transmission for a road vehicle with hybrid propulsion; the transmission having: a gearbox provided with one primary shaft, one secondary shaft and at least one pump actuated by an activating shaft; at least one clutch connected to the primary shaft and having a part which is normally conductive and can be connected to a drive shaft of a thermal engine; a reversible electric machine having a shaft mechanically connectable to the primary shaft; a first mechanical transmission which transmits the motion from the normally conductive part of the clutch to the activating shaft; and a second mechanical transmission which transmits the motion from the shaft of the electric machine to the activating shaft.

17 Claims, 11 Drawing Sheets

FOREIGN PATENT DOCUMENTS

| | | |
|---|---|---|
| DE | 10133695 A1 | 3/2002 |
| DE | 102006059901 A1 | 6/2008 |
| EP | 1216871 A2 | 6/2002 |
| FR | 2884766 A1 | 10/2006 |
| GB | 2273323 A | 6/1994 |
| JP | 11-107936 A | 4/1999 |
| WO | WO-2006089376 A1 | 8/2006 |

OTHER PUBLICATIONS

"Italian Application Serial No. B020090465, Search Report dated Mar. 10, 2010", 2 pgs.

"European Application Serial No. EP 10170346. European Search Report mailed Sep. 28, 2010", 3 pgs.

\* cited by examiner

TRANSMISSION FOR A ROAD VEHICLE WITH HYBRID PROPULSION

PRIORITY CLAIM AND RELATED APPLICATIONS

This application is a continuation application of U.S. patent application Ser. No. 12/841,057, filed Jul. 21, 2010, which claims the benefit of priority under 35 U.S.C. Section 119 to Italian Patent Application Serial No. B02009A 000465, filed on Jul. 21, 2009, each of which are incorporated herein by reference in their entirety.

This application claims the benefit of priority under 35 U.S.C. Section 119 to Italian Patent Application Serial No. B02009A 000752, filed on Nov. 18, 2009, which is incorporated herein by reference in its entirety.

TECHNICAL FIELD

The present invention relates to a transmission for a road vehicle with hybrid propulsion.

BACKGROUND

A hybrid vehicle comprises an internal combustion thermal engine, which transmits torque to the driving wheels by means of a transmission provided with a gearbox coupled to a clutch, and at least one electric machine, which is electrically connected to an electric storage system and mechanically connected to the driving wheels.

The following is possible while traveling: either a thermal operating mode, in which the torque is generated only by the thermal engine and the electric machine may possibly work as a generator for recharging the storage system; or an electric operating mode, in which the thermal engine is off and the torque is generated only by the electric machine working as a motor; or a combined operating mode, in which the torque is generated both by the thermal engine and by the electric machine working as a motor. Furthermore, in order to increase the overall energy efficiency during all steps of decelerating, the electric machine may be used as a generator for a regenerative deceleration in which the kinetic energy possessed by the vehicle is partially converted into electricity, which is stored in the electric storage system, instead of being completely dissipated in friction.

On some hybrid vehicles, the gearbox comprises a circulation pump for circulating lubricating oil through the gears of the gearbox so as to ensure adequate lubrication of the gears. Furthermore, in the case of a hydraulically actuated, automatic manual transmission (commonly named "AMT"), the gearbox also comprises an actuation pump, which supplies the hydraulic pressure needed for operating the hydraulic actuators engaging and selecting the gears and controlling the clutch.

In the currently manufactured gearboxes, the gearbox pumps are actuated by an auxiliary activating shaft, which takes motion from the drive shaft (possibly with the interposition of a transmission shaft), i.e. upstream of the clutch, so that it is always actuated when the clutch is open. This condition makes the mechanical connection of an electric machine to a shaft of the gearbox less convenient, because in case of electric traction (i.e. when the thermal engine is off), the clutch must remain closed to actuate the pumps, and therefore the thermal engine is also rotatably fed (with considerable frictions and inertia). Furthermore, because the electric machine cannot be rotated when disconnected from the thermal engine (under these conditions, there would be no lubrication of the gearbox and especially no hydraulic pressure required to actuate the clutch), the electric machine may not be used as a starter motor of the thermal engine, because in order to use the electric machine as a starter motor of the thermal engine, the electric machine should be rotated at high speed before connecting the electric machine to the thermal engine for the electric machine to store a high amount of kinetic energy.

In order to solve the above-described problem, it has been suggested to make the activating shaft of the gearbox pumps mechanically independent from the drive shaft, and to actuate the gearbox pump activating shaft by means of a dedicated electric motor; however, this solution normally requires re-designing the gearbox, with high development costs, and is not very efficient from the energy point of view, because when the thermal engine is running (i.e. for most time of use of the vehicle), using part of the torque generated by the thermal engine is more efficient for directly actuating the auxiliaries rather than converting part of the torque generated by the thermal engine into electricity, which is transformed back into mechanical torque by an electric motor. Furthermore, arranging an electric motor mechanically coupled to the activating shaft of the gearbox pumps is not easy, because the gearbox zone has small free spaces, it is quite hot due to the heat generated by friction inside the clutch and the gearbox, and it is not very ventilated as it is normally located in the middle of the vehicle.

Patent application EP1216871A2 and patent application US2008087487A1 describe a transmission for a road vehicle with hybrid propulsion comprising: a twin-clutch gearbox provided with two primary shafts, a secondary shaft, and a lubrication pump; two clutches connected to the primary shafts and having a normally conductive part, which may be connected to a drive shaft of a thermal engine; a reversible electric machine having a shaft mechanically connected to one of the two primary shafts; a first mechanical transmission, which transmits the motion from the normally conductive part of the clutch to the lubrication pump and comprises a first freewheel; and a second mechanical transmission, which transmits the motion from the shaft of the electric machine to the lubrication pump and comprises a second freewheel.

SUMMARY

Some of the disclosed examples provide a transmission for a road vehicle with hybrid propulsion, which is free from the above-described drawbacks while being easy and cost-effective to be implemented.

According to various examples, a transmission for a road vehicle with hybrid propulsion is provided as claimed in the attached claims.

BRIEF DESCRIPTION OF THE DRAWINGS

The present invention will now be described with reference to the accompanying drawings, which illustrate some non-limitative embodiments thereof, in which.

DETAILED DESCRIPTION

Figure 1:
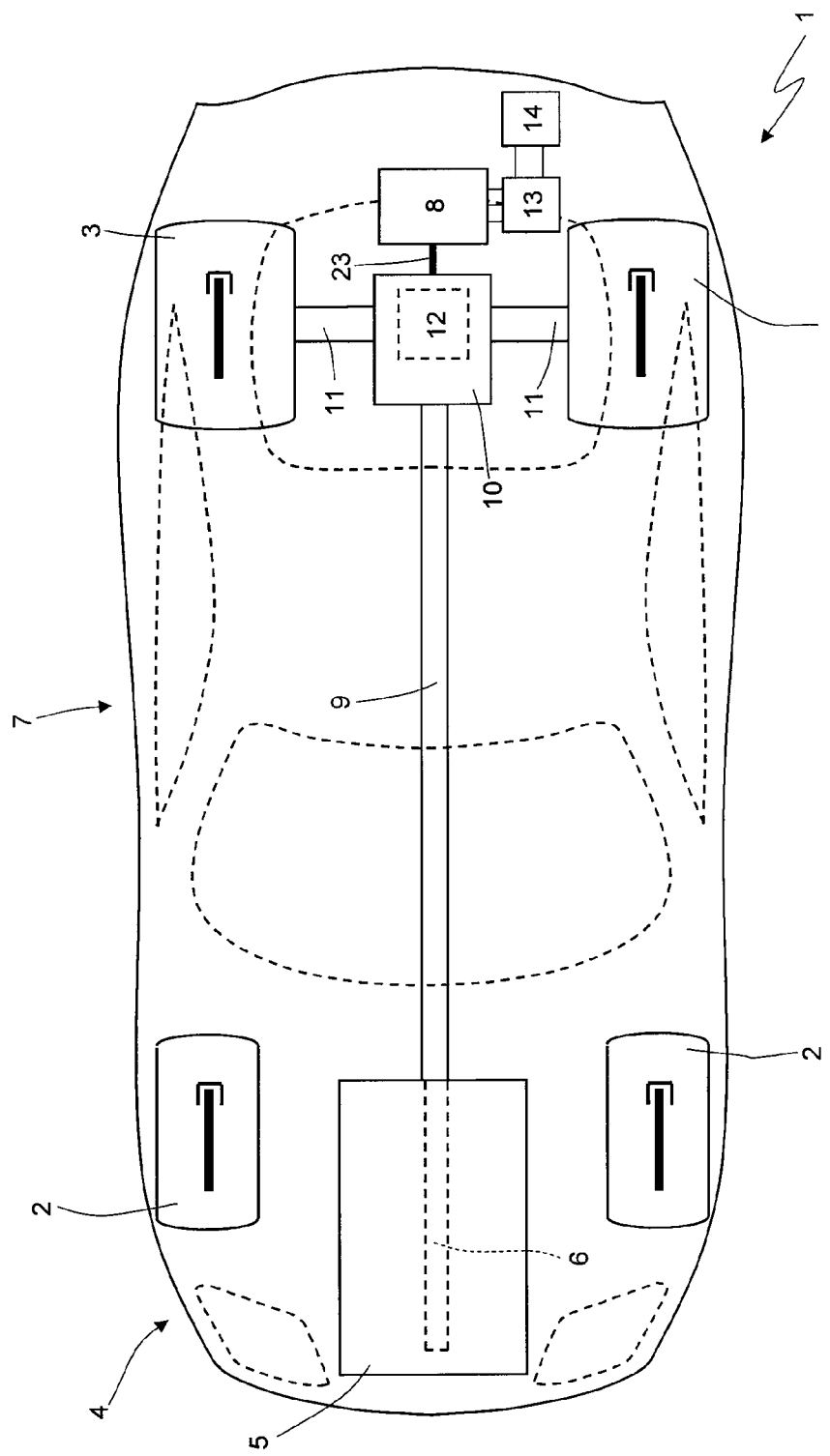
FIG. 1 is a diagrammatic view of a road vehicle with hybrid propulsion.

In FIG. 1, numeral 1 indicates as a whole a road vehicle with hybrid propulsion provided with two front wheels 2 and two rear driving wheels 3, which receive torque from a hybrid propulsion system 4.

The hybrid propulsion system 4 comprises an internal combustion engine 5, which is arranged in a frontal position and is provided with a drive shaft 6, an automatic manual transmission 7 (commonly named "AMT"), which transmits the torque generated by the internal combustion engine 5 to the rear drive wheels 3, and a reversible electric machine 8 (i.e. an electric machine which may work either as an electric motor, using electricity and generating mechanical torque, or as an electric generator, using mechanical energy and generating electricity), which is mechanically connected to the transmission 7.

Transmission 7 comprises a transmission shaft 9, which at one end is angularly integral with the drive shaft 6, and at the other end is mechanically connected to a twin-clutch gearbox 10, which is arranged in a rear position and transmits the motion to the rear driving wheels 3 by means of two axle shafts 11, which receive motion from a differential 12. The reversible electric machine 8 is mechanically connected to the twin-clutch gearbox 10, as described in greater detail below, and is driven by an electronic power converter 13 connected to an electric storage system 14, which is adapted to store electricity and is provided with chemical batteries and/or supercapacitors.

Figure 2:
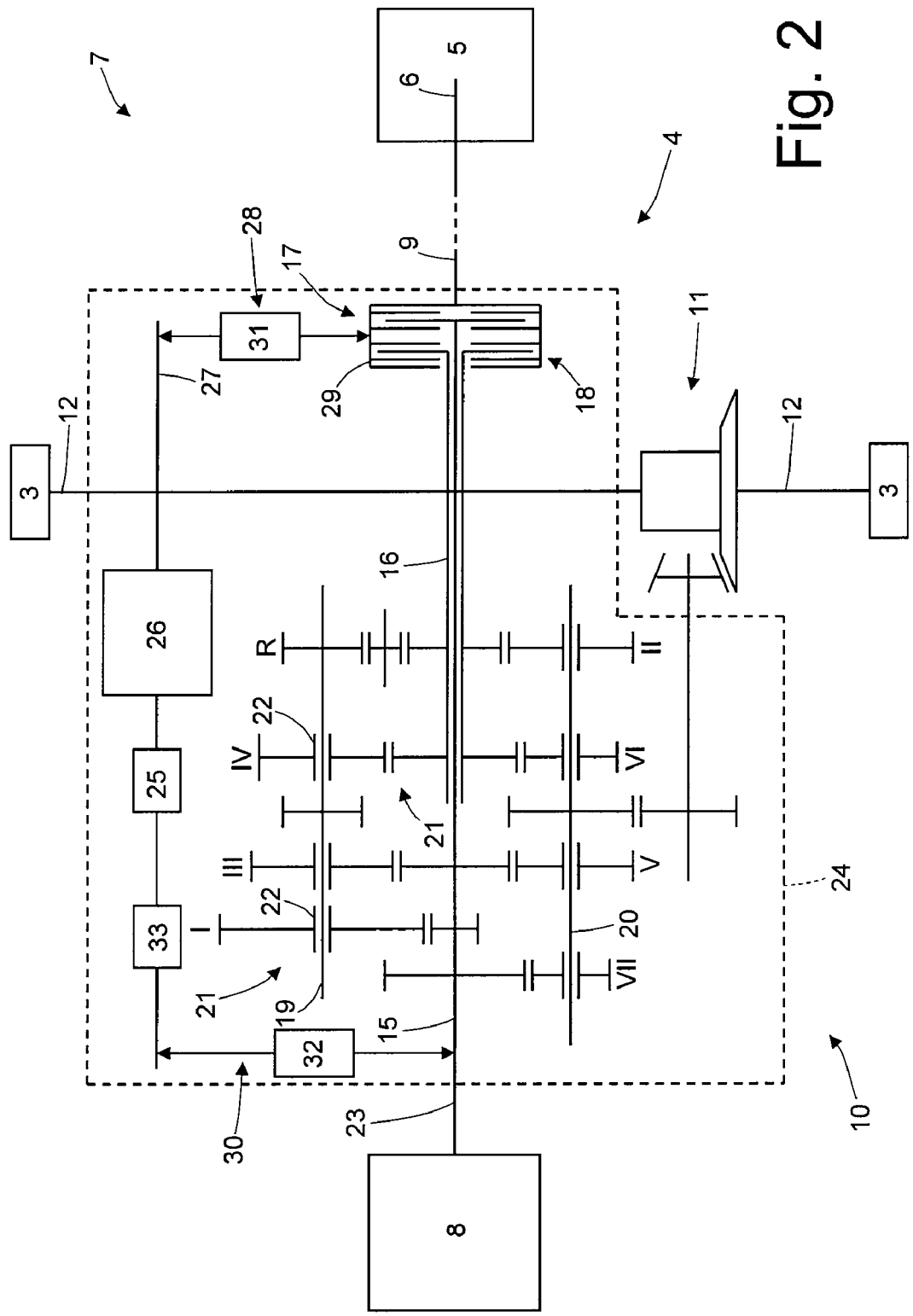
FIG. 2 is a diagrammatic view of a transmission of the road vehicle in FIG. 1, made in accordance with some examples.

As shown in FIG. 2, the twin-clutch gearbox 10 comprises two mutually coaxial, independent primary shafts 15 and 16, inserted within each other, and two coaxial clutches 17 and 18 arranged in series, each of which is adapted to connect a respective primary shaft 15 or 16 to the transmission shaft 9 (and thus to the drive shaft 6 of the thermal internal combustion engine 5). Furthermore, the twin-clutch gearbox 10 comprises two secondary shafts 19 and 20, which are both angularly integral with the inlet of differential 11, which transmits the motion to the rear driving wheels 3.

The twin-clutch gearbox 10 shown in FIG. 2 has seven forward speeds indicated by Roman numerals (first gear I, second gear II, third gear III, fourth gear IV, fifth gear V, sixth gear VI and seventh gear VII) and one reverse gear (indicated by the letter R). The primary shafts 15 and 16 are mechanically coupled to the secondary shafts 19 and 20 by means of a plurality of gear pairs 21, each of which defines a respective speed, and comprises a primary gear which is mounted to a primary shaft 15 or 16 and a secondary gear, which is mounted to a secondary shaft 19 or 20 and permanently engages the primary gear. In order to allow the correct operation of the twin-clutch gearbox 10, all the odd speeds (first gear I, third gear III, fifth gear V, seventh gear VII) are coupled to a same primary shaft 15, while all the even speeds (second gear II, fourth gear IV, and sixth gear VI) are coupled to the other primary shaft 16.

Each primary gear 8 is keyed onto a respective primary shaft 15 or 16 to rotate, again integrally, with the primary shaft 15 or 16 itself, and permanently engages the respective secondary gear; instead, each secondary gear is idly mounted to the respective secondary shaft 19 or 20. The twin-clutch gearbox 10 comprises a respective synchronizer 22 for each gear pair 21, which is coaxially mounted to the corresponding secondary shaft 19 or 20, and is adapted to be actuated to engage the respective secondary gear 19 or 20 (i.e. to make the respective secondary gear angularly integral with the secondary shaft 19 or 20).

The electric machine 8 has a drive shaft 23, which is permanently connected to the primary shaft 15 so as to rotate, again integrally, with the primary shaft 15 itself. According to certain examples, starting from an existing twin-clutch gearbox 10 not initially designed for hybrid traction, the primary shaft 15 is elongated on the side opposite to the clutches 17 and 18 so as to protrude from a box 24 of the gearbox; therefore, outside the box 24 of the gearbox, the primary shaft 15 is made angularly integral (e.g. by a butt joint) with the shaft 23 of the electric machine 8.

Reference is made to patent application IT2008BO00594 incorporated herein by reference in its entirety for a description of the operating modes of the electric machine 8.

The twin-clutch gearbox 10 comprises a circulation pump 25 for circulating lubricating oil through the gears of gearbox 10 so as to ensure adequate lubrication of the gears. Furthermore, the twin-clutch gearbox 10 comprises an actuating pump 26 which provides the hydraulic pressure required to operate the hydraulic actuators engaging the gears (e.g. the actuators of synchronizers 22) and the control actuators of clutches 17 and 18.

The two pumps 25 and 26 of gearbox 10 are actuated by a passing, auxiliary activating shaft 27 (i.e. which passes through each pump 25 and 26), which on one side takes the motion, by means of a mechanical transmission 28, from a front basket 29 of the clutches 17 and 18, which is integral with drive shaft 6 (with the interposition of transmission shaft 9) and on the opposite side, takes the motion, by means of a mechanical transmission 30, from the primary shaft 15, which is integral with shaft 23 of the electric machine 8. The front basket 29 forms a normally conductive (i.e., transmissive) part of the clutches 17 and 18, as it receives motion from thermal engine 5 and transmits it to the normally conducted parts (i.e. the hubs of clutches 17 and 18) integral with the primary shafts 15 and 16.

The mechanical transmission 28 includes a cascade of gears and is provided with a freewheel 31 (or idle wheel 31), which transmits the motion (i.e. engages) when it rotates in a certain direction and does not transmit the motion (i.e. does not engage) when it rotates in the opposite direction. Similarly, mechanical transmission 30 also includes a cascade of gears and is provided with a freewheel 32 (or idle gear 32), which transmits the motion (i.e. engages) when it rotates in a certain direction and does not transmit the motion (i.e. does not engage) when it rotates in the opposite direction. The engaging direction of the freewheel 32 of the mechanical transmission 30 is opposite to that of the freewheel 31 of the mechanical transmission 28; in other words, freewheel 32 transmits the motion (i.e. engages) when it rotates in a certain direction, while freewheel 31 transmits the motion (i.e. engages) when it rotates in the opposite direction.

Finally, the gear ratio determined by the mechanical transmission 28 is higher than the gear ratio determined by the mechanical transmission 30, so that the mechanical transmission 28 rotates the activating shaft 27 faster than the mechanical transmission 30, the input speed being equal.

According to a possible embodiment, a disengagement sleeve 33 is interposed along the activating shaft 27 and upstream of the second mechanical transmission 32, and serves the function of allowing the portion of the activating shaft 27 arranged on the right of the disengagement sleeve 33 to axially slide with respect to the portion of the activating shaft 27 arranged on the left of the disengagement sleeve 33. The objective of the disengagement sleeve 33 is to allow axial adjustments of the position of the mechanical transmission 32 (typically to recover constructional tolerances during the assembly step) without affecting the pumps 25 and 26 of gearbox 10 and the mechanical transmission 30.

Figure 3:
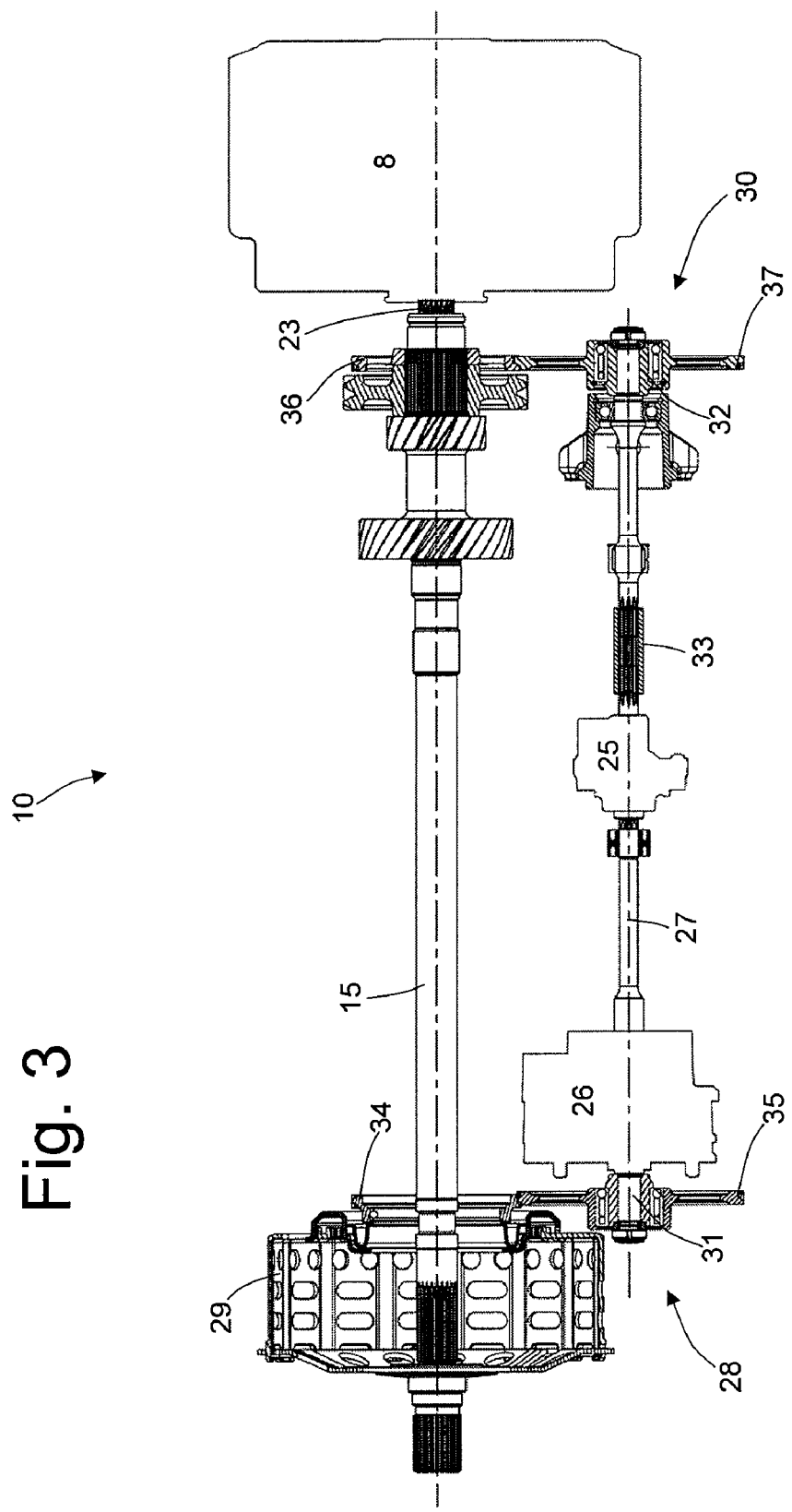
FIG. 3 is a diagrammatic section view with parts removed for clarity of an activating shaft of the transmission in FIG. 2.

As shown in FIG. 3, the mechanical transmission 28 consists of a cascade of gears and comprises a gear 34 integral with the front basket 29 and a gear 35 which engages gear 34 and is connected to the activating shaft 27 by means of the freewheel 31; in particular, freewheel 31 is integrated in gear 35, i.e. forms the gear hub 35. Similarly, the mechanical transmission 30 also consists of a cascade of gears and comprises a gear 36 integral with the primary shaft 15 and a gear 37 which engages gear 36 and is connected to the activating shaft 27 by means of the freewheel 32; in particular, freewheel 32 is integrated in gear 37, i.e. forms the hub of the gear 37.

The operation of transmission 7 is described below with reference to the activation of pumps 25 and 26 of gearbox 10.

When the rotation speed imposed by the activating shaft 27 of the mechanical transmission 28 (and thus of the drive shaft 6 of thermal engine 5) is higher than the rotation speed imposed by the activating shaft 27 of the mechanical transmission 30 (and thus of the primary shaft 15 integral with the electric machine 8), then freewheel 31 is engaged and thus transmits the motion towards the pumps 25 and 26 of gearbox 10, while freewheel 32 is not engaged and thus does not transmit the motion towards the pumps 25 and 26 of gearbox 10; in other words, the activating shaft 27 is rotated by the drive shaft 6 of thermal engine 5, while the activating shaft 27 is isolated from the primary shaft 15 integral with the electric machine 8.

When the rotation speed imposed by the activating shaft 27 of the mechanical transmission 28 (and thus of the drive shaft 6 of thermal engine 5) is lower than the rotation speed imposed by the activating shaft 27 of the mechanical transmission 30 (and thus of the primary shaft 15 integral with the electric machine 8), then freewheel 32 is engaged and thus transmits the motion towards the pumps 25 and 26 of gearbox 10, while freewheel 31 is not engaged and thus does not transmit the motion towards the pumps 25 and 26 of gearbox 10; in other words, the activating shaft 27 is rotated by the primary shaft 15 integral with the electric machine 8, while the activating shaft 27 is isolated from the drive shaft 6 of thermal engine 5.

In use, when thermal engine 5 is on, i.e. when the drive shaft 6 of thermal engine 5 rotates, and one of the clutches 17 and 18 is closed, the rotation speed imposed by the activating shaft 27 of the mechanical transmission 28 (and thus of the drive shaft 6 of thermal engine 5) is always higher than the rotation speed imposed by the activating shaft 27 of the mechanical transmission 30 (and thus of the primary shaft 15 integral with the electric machine 8), because the transmission ratio determined by the mechanical transmission 28 is higher than the transmission ratio determined by the mechanical transmission 30 so that, the input speed being equal, the mechanical transmission 28 rotates the activating shaft 27 faster that the mechanical transmission 30. In this circumstance, the activating shaft 27 is rotated by the drive shaft 6 of thermal engine 5.

When thermal engine 5 is on, i.e. the drive shaft 6 of terminal engine 5 rotates, and the clutches 17 and 18 are both open, the activating shaft 27 may be rotated either by the drive shaft 6 of thermal engine 5 or by the primary shaft 15 integral with the electric machine 8 according to the rotation speed of shaft 23 of the electric machine 8 (i.e. the primary shaft 15 of the gearbox). Indeed, when both clutches 17 and 18 are open, the rotation speed of the primary shaft 15 of the gearbox is completely independent from the rotation speed of the drive shaft 6 of thermal engine 5. In all cases, when thermal engine 5 is on, the activating shaft 27 is rotated by the drive shaft 6 of thermal engine 5; generally, when thermal engine 5 is on, the activating shaft 27 is rotated by the primary shaft 15 integral with the electric machine 8 only in case of regenerative braking when the electric machine 8 is operated as a generator to recover the kinetic energy of vehicle 1.

When thermal engine 5 is off, i.e. the drive shaft 6 of thermal engine 5 is off, and the shaft 23 of the electric machine 8 (and thus in case of rotation of the primary shaft 15) rotates at the rotation speed imposed by the activating shaft 27 of the mechanical transmission 28 (and thus of the drive shaft 6 of thermal engine 5) is always lower than the rotation speed imposed by the activating shaft 27 of the mechanical transmission 30 (i.e. of the primary shaft integral with the electric machine 8). In this circumstance, the activating shaft 27 is rotated by the primary shaft 15 integral with the electric machine 8.

When thermal engine 5 is off, i.e. the drive shaft 6 of thermal engine 5 is stopped, and the shaft 23 of the electric machine 8 is stopped, then the activating shaft 27 is also stopped.

As shown in FIG. 2, gearbox 10 comprises a reverse gear R, which receives motion from the primary shaft 16; therefore, the reverse movement of vehicle 1 is achieved by means of gearbox 10 and by exploiting the torque generated by the internal combustion engine 5. According to a different embodiment (not shown), gearbox 10 could be free from reverse gear R, which is replaced by a further forward gear (in this case, an eighth gear VIII) and the reverse movement of vehicle 1 is obtained by exploiting the electric machine 8; in other words, the electric machine 8 is operated as an engine with a rotation direction opposite to the usual one for applying a torque to the rear drive wheels 3, which torque pushes vehicle 1 in reverse. In this embodiment, gearbox 10 may have an additional forward gear without any increase of its constructional complication (instead with a simplification, because the idle gear of reverse gear R is missing), thus exploiting the versatility of the electric machine 8, which may rotate in either directions.

A limit to the embodiment of transmission 7 shown in FIGS. 2 and 3 consists in that if the electric machine 8 is used to make the reverse movement of vehicle 1, the electric machine 8 is not able to rotate the activating shaft 27 (and thus the pumps 25 and 26 of the gearbox) due to the presence of the freewheel 32 in the mechanical transmission 30. Therefore, if the electric machine 8 is used to obtain the reverse movement of vehicle 1, the actuating pump 26 which provides the hydraulic pressure required for operating the hydraulic actuators engaging the gears (i.e. the actuators of synchronizers 22) and the actuators controlling the clutches 17 and 18, is not able to work; in this circumstance, in order to avoid the operative blocking of the hydraulic actuators, a hydraulic accumulator large in size should be provided in the hydraulic circuit of the actuating pump 26. However, finding an adequate space to contain such a hydraulic accumulator large in size close to gearbox 10 is not easy.

Figure 4:
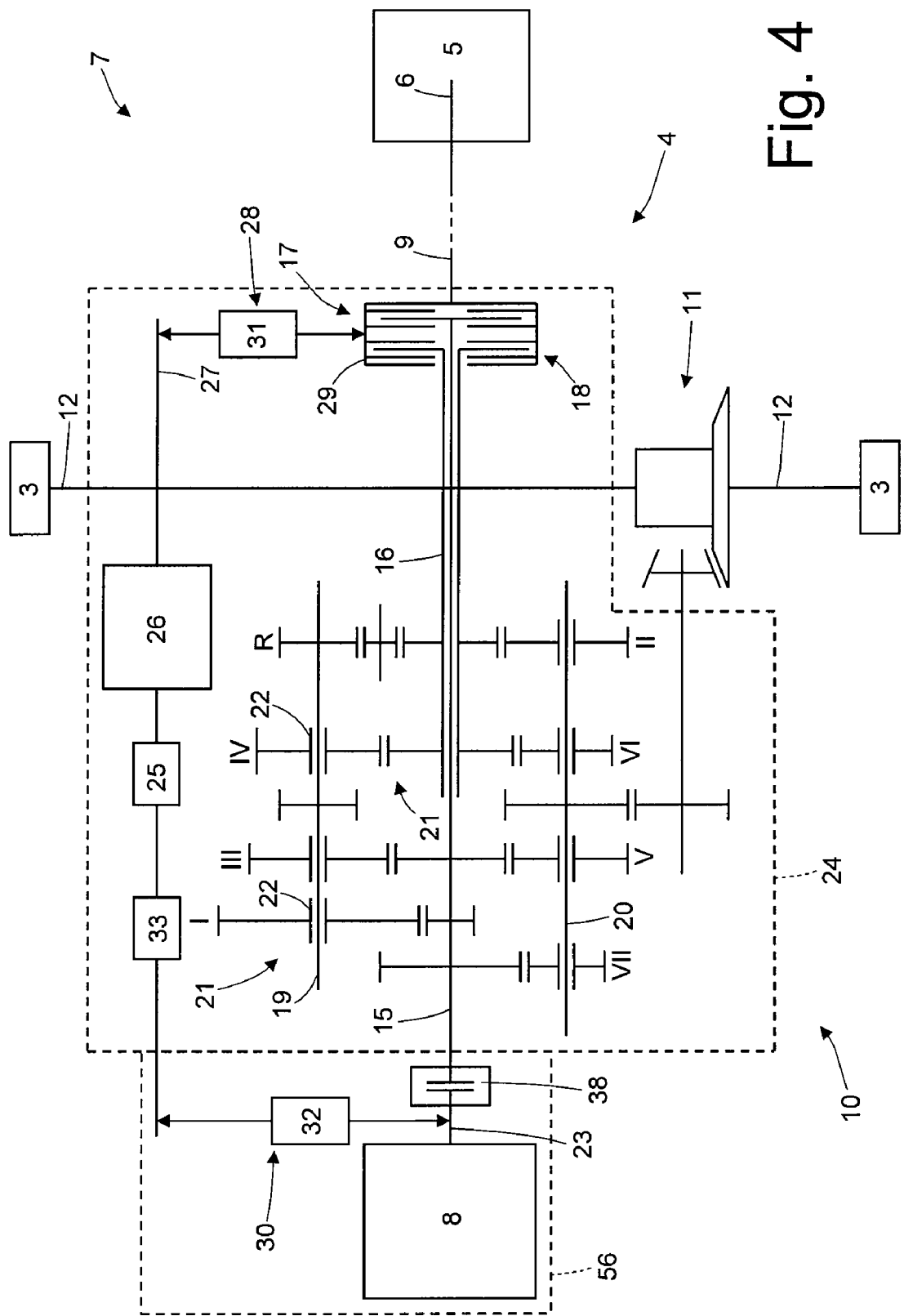
FIG. 4 is a diagrammatic view of a further embodiment of a transmission of the road vehicle in FIG. 1 made in accordance with some examples.

The alternative embodiment of transmission 7 shown in FIG. 4 has been suggested to solve the aforesaid problem.

The transmission 7 shown in FIG. 4 differs from the transmission 7 shown in FIG. 2, as in the transmission 7 shown in FIG. 4, the shaft 23 of the electric machine 8 is not permanently connected to the primary shaft 15 of gearbox 10 (such as in the transmission 7 shown in FIG. 2), but instead the shaft 23 of the electric machine 8 is detachably connected to the primary shaft 15 of gearbox 10 (i.e. it can be decoupled) by means of a connecting device 38 which may be electronically driven. Therefore, by acting on the connecting device 38, either the shaft 23 of the electric machine 8 may be connected to the primary shaft 15 of gearbox 10 or the shaft 23 of the electric machine 8 may be detached from the primary shaft 15 of gearbox 10. According to some examples, the connecting device 38 consists of an electromagnetic "dog clutch", which does not allow a relative sliding between the shaft 23 of the electric machine 8 and the primary shaft 15 of gearbox 10, which is described more in detail below.

Due to the presence of the connecting device 38, the shaft 23 may be disconnected from the electric machine 8 of the primary shaft 15 of gearbox 10 as required to obtain the operating modes that would not be possible in the embodiment of the transmission 7 shown in FIG. 2.

In this embodiment, the mechanical transmission 30 connects the activating shaft 27 of the shaft 23 of the electric machine 8, therefore the connecting device 38 is arranged downstream of the mechanical transmission 30 with respect to the electric machine 8.

Figure 5:
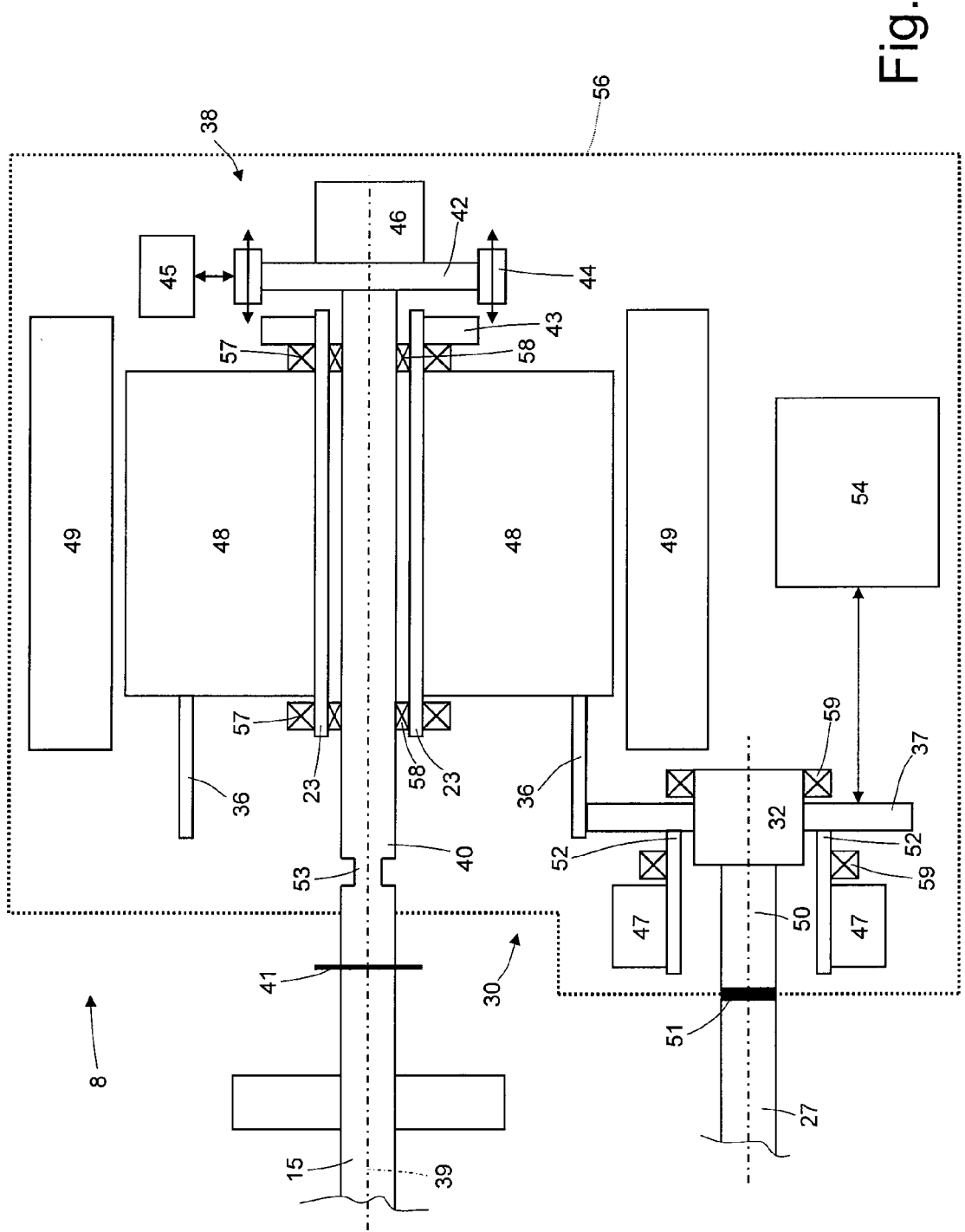
FIG. 5 is a diagrammatic view of the mechanical connections of an electric machine of the transmission in FIG. 4.

As shown in FIG. 5, the shaft 23 of the electric machine 8 is pivotally mounted about a rotation axis 39, which is also in common with the primary shaft 15 (i.e. the shaft 23 of the electric machine 8 is coaxial to the primary shaft 15). Furthermore, the shaft 23 of the electric machine 8 has a tubular shape so as to have a passing cavity in the middle. A connecting shaft 40 is arranged within the central passing cavity of the shaft 23 of the electric machine 8, which shaft is pivotally mounted about the rotation axis 39 and forms an extension of the primary shaft 15 to which it is butt-jointed by means of a coupling 41. The connecting shaft 40 crosses the whole shaft 23 of the electric machine 8, and on the opposite side with respect to the primary shaft 15, it may be secured to the shaft 23 by means of the connecting device 38. In other words, the connecting device 38 is arranged on the opposite side of the electric machine 8 with respect to the primary shaft and receives motion from the primary shaft 15 by means of the connecting shaft 40, which is arranged inside the shaft 23 of the electric machine 8 and crosses the whole shaft 23.

The connecting device 38 comprises a gear 42 with straight teeth which is integral with the connecting shaft 40, a gear 43 with straight teeth which is integral with the shaft 23 and arranged parallel and facing the gear 42, a toothed sleeve 44 carried by the gear 42 and mounted so as to be axially movable, and an electromagnetic actuator device 55, which is adapted to axially move the sleeve 44 between a decoupling position (shown in FIG. 5), in which sleeve 44 does not engage gear 43, and a coupling position (not shown), in which sleeve 44 engages gear 43 to make the gear 43 itself angularly integral with gear 42.

In order to move sleeve 44 from the decoupling position to the coupling position, i.e. to make the gear 42 which rotates along with the primary shaft 15 integral with the gear 43 which rotates with the shaft 23 of the electric machine 8, the two gears 42 and 43 should necessarily be synchronous, i.e. rotate at substantially the same speed. Therefore, in order to be able to move the sleeve 44 from the decoupling position to the coupling position, the electric machine 8 must be driven to follow the rotation of the primary shaft 15 (i.e. of the connecting shaft 40); for this purpose, there are provided an encoder 46 which detects the angular position of the primary shaft 15 in real time (i.e. of the connecting shaft 40) and an encoder 47 which detects the angular position of shaft 23 of the electric machine 8 in real time: by exploiting the measurements provided by the two encoders 46 and 47, the electric machine 8 may be driven to synchronize the rotation of the two gears 42 and 43, so as to allow the engagement of sleeve 44 on gear 43. According to some examples, the encoder 46 is integral with the gear 42 and is arranged on the opposite side with respect to the connecting shaft 40.

The electric machine 8 comprises a cylindrical rotor 48, which is carried by the shaft 23 to rotate about the rotation axis 39, and a cylindrical stator 49, which is arranged in a fixed position about the rotor 48. Rotor 48 directly supports the gear 36 of the mechanical transmission 30; in this embodiment, gear 36 is cup-shaped, protrudes swing from one side of rotor 48, and has external teeth so as to engage the teeth of the other gear 37 belonging to the mechanical transmission 30. Gear 37 which engages gear 36 is connected to the activating shaft 27 by means of the freewheel 32; in particular, freewheel 32 is integrated in gear 37, i.e. forms the hub of gear 37, and transmits the motion to a connecting shaft 50, which is butt-jointed to the activating shaft 27. In some examples, the connecting shaft 50 is preferably connected to the activating shaft 27 by means of an Oldham joint 51 (or, alternatively, a Schmidt joint 51) which allows some misalignment between the two shafts 27 and 50; the Oldham joint 51 serves the function of compensating for inevitable constructional tolerances avoiding to generate mechanical strain deriving from imperfect alignment between the two shafts 27 and 50. The electric machine 8 is centered with respect to the primary shaft 15 (i.e. perfect coaxiality between the shafts 15 and 40 is sought when mounting the electric machine 8); therefore, all constructional tolerances are discharged onto the coupling between the shafts 27 and 50, which may thus have imperfect coaxiality, and such misalignments are absorbed and compensated by the Oldham joint 51.

According to some examples, encoder 47 reads the angular position of the crown of gear 37 (which permanently engages the gear 36 and thus is angularly integral with the rotor 48 and the shaft 23 of the electric machine 8); in particular, the crown of gear 37 supports a cup-shaped element 52, which protrudes cantilevered from one side of the gear 37 itself and is coupled to the encoder 47.

According to some examples, the connecting shaft 40 close to the coupling 41 has a weakened zone 53, which is intended to fracture, thus determining a controlled breakage in case of excessive overloads. In other words, in case of errors in controlling the electric machine 8, very strong and abnormal torque may appear between the primary shaft 15 of gearbox 10 and the shaft 23 of the electric machine 8, which torque could determine the mechanical destruction of the gearbox 10 and/or of the electric machine 8; in order to avoid the gearbox 10 and/or the electric machine 8 from damaging, a weakened zone 53 is created, which breaks when the torque acting on the connecting shaft 40 is too high (i.e. exceeds a maximum value established during the step of designing). The replacement of the connecting shaft 40 after breakage in the weakened zone 53 is relatively simple and fast, as the connecting shaft 40 may be axially removed from the electric machine 8 on the side of the connecting device 38 once coupling 41 has been opened (obviously once the connecting device 38 has been preventively removed).

Gear 37 (which permanently engages gear 36 and thus is angularly integral with the rotor 48 and the shaft 23 of the electric machine 8) also rotates a circulation pump 54 by means of a cascade of gears (not shown), which pump is part of a cooling and lubrication circuit 55 of the electric machine 8 (shown in FIG. 6), which will be described below.

The electric machine 8 comprise a box 56, which houses rotor 48, stator 49, shaft 23, connecting shaft 40 (which protrudes from one end of the box 56), mechanical transmission 30 (i.e. gears 36 and 37, and freewheel 32) and connecting shaft 50 ending with the Oldham joint 51 therein. The box 56 directly supports stator 49, while the shaft 23 is supported by means of bearings 57 of shaft 23 (which directly supports the rotor 48 and the connecting shaft 40 by means of the bearings 58), and supports the components of the mechanical transmission 30 by means of bearings 59. The box 56 of the electric machine 8 is made of metal and is fixed (typically screwed) to the box 24 of gearbox 10 to form a single part with the box 24 itself; when the box 56 of the electric machine 8 is fixed to the box 24 of gearbox 10, the connecting shaft 40 and the primary shaft 15 are joined to each other by means of the coupling 41, and the activating shaft 27 and the connecting shaft 50 are joined to each other by means of the Oldham joint 51.

The above-described transmission 7 has many advantages.

Firstly, the above-described transmission 7 is simple and cost-effective to be implemented, particularly starting from an existing transmission which was not created for hybrid applications, because the general structure of gearbox 10, and in particular the position of the pumps 25 and 26 of gearbox 10, is not modified; in essence, starting from an existing transmission, which was not created for hybrid applications, the only interventions which should be carried out are the extension of the primary shaft 15 and of the activating shaft 27, the insertion of the freewheels 31 and 32, and the insertion of the mechanical transmission 30.

Furthermore, in case of electric traction (i.e. when thermal engine 5 is off) in the above-described transmission 7, the clutches 17 and 18 may be opened because the pumps 25 and 26 of gearbox 10 are rotated by means of the mechanical transmission 30.

Finally, the above-described transmission 7 is particularly efficient from the energy point of view, because when thermal engine 5 is off, the mechanical energy absorbed by the pumps 25 and 26 of gearbox 10 is taken directly by the drive shaft 6 of thermal engine 5 without any type of electromechanical conversion.

Figure 6:
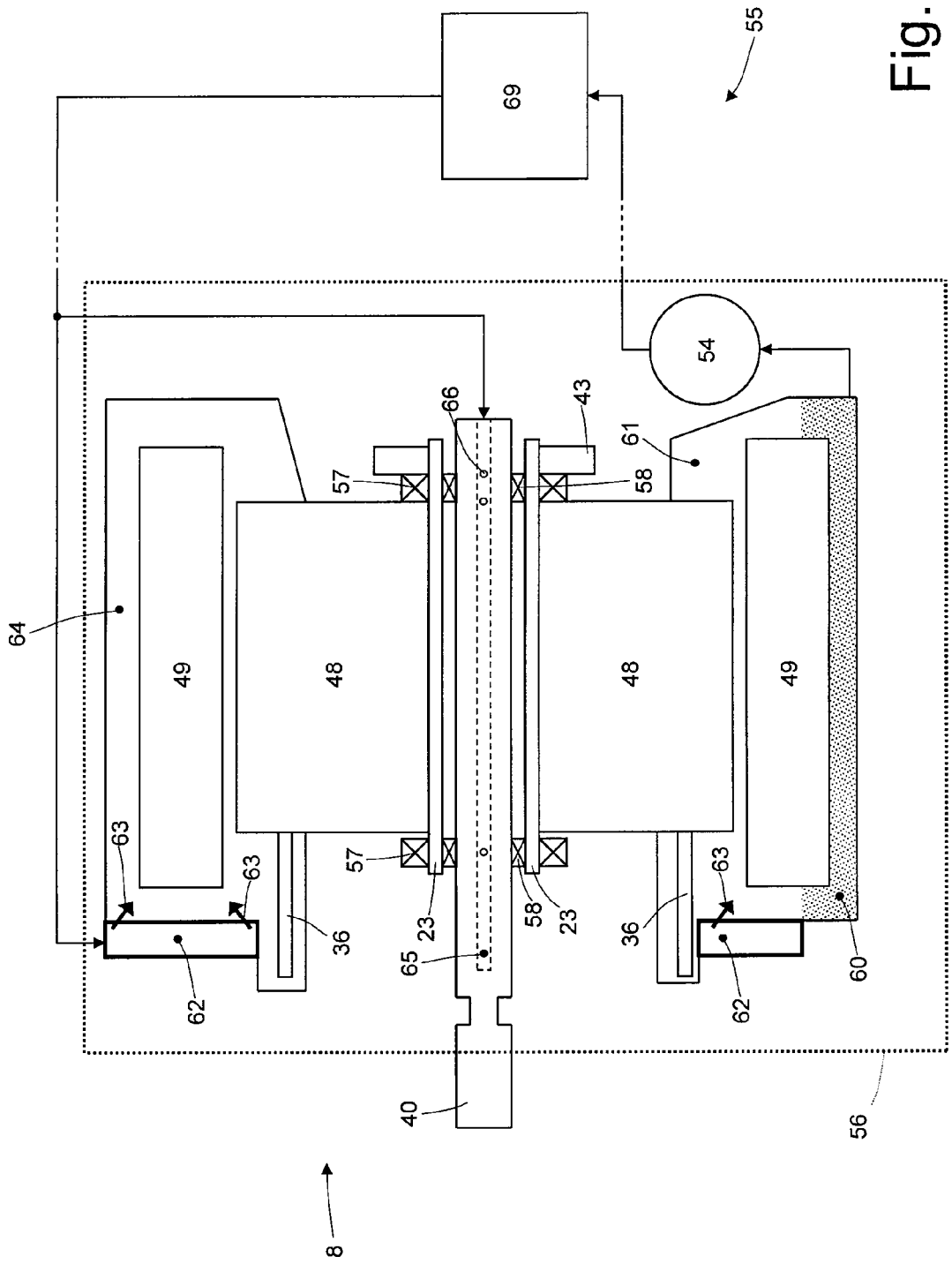
FIG. 6 is a diagrammatic view of a cooling and lubrication circuit of the electric machine in FIG. 5.

As shown in FIG. 6, the cooling and lubrication circuit 55, which circulates oil 60 in the rotor 48 and the stator 49 serving the function of cooling rotor 48 and stator 49, is present inside box 56 of the electric machine 8; it is worth noting that the oil 60 has good dielectric features, so as to be electrically insulating and thus avoid the formation of short-circuits through the oil 60 itself. Furthermore, the cooling circuit and lubrication circuit 55 circulates oil 60 in the bearings 57, 58 and 59, having in this case the function of lubricating the bearings 57, 58 and 59 themselves.

The cooling and lubrication circuit 55 comprises a collection sump 61 of the oil 60, which is defined within the box 56 and in the lower part of the box 56 itself. The collection sump 61 serves the function of collecting the oil 60, which drips downwards into the box 56 by gravity, and thus forms a tank of the oil 60 itself. In essence, the cooling and lubrication circuit 55 has a "dry sump" type structure, in which the oil 60 is cyclically collected by gravity in the collection sump 61 defined in the lower part of the box 56.

The cooling and lubrication circuit 55 comprises an annular cooling chamber 62, which develops circularly about the rotation axis 39 (i.e. about the connecting shaft 40) and is arranged by the side of the stator 49 of the electric machine 8 on the side of the stator 49 facing the gearbox 10 (i.e. the cooling chamber 62 is interposed between gearbox 10 and stator 49). Some cooling nozzles 63 (only three of which are shown in FIG. 6) originate from an upper portion of the cooling chamber 62, which nozzles receive pressurized oil 60 from the cooling chamber 62 and address a jet of atomized oil 60 towards the stator 49 of the electric machine 8; in other words, by virtue of the action of the cooling nozzles 63 of the stator 49 (and partially also the rotor 48, which is next to the stator 49) is constantly invested by an oil mist 60. Between the stator 49 of the electric machine 8 and the wall of the box 56 are defined in the cooling channels 64 (only one of which is shown in FIG. 6), which are arranged axially in the upper part of the stator 49 and serve the function of feeding the oil 60 "fired" by the cooling nozzles 63 along the entire outer cylindrical surface of the stator 49.

The cooling and lubrication circuit 55 comprises a distribution channel 65, which is obtained in central position inside the connecting shaft 40. The distribution channel 65 has a central oil inlet opening 60 on one end of the connecting shaft 40 and a plurality of outlet holes 66, which are arranged radially and are obtained crossing the connecting shaft 40 to lead from the connecting shaft 40 itself to the bearings 57 and 58, of the connecting device 38, and of the gear 36.

Figure 7:
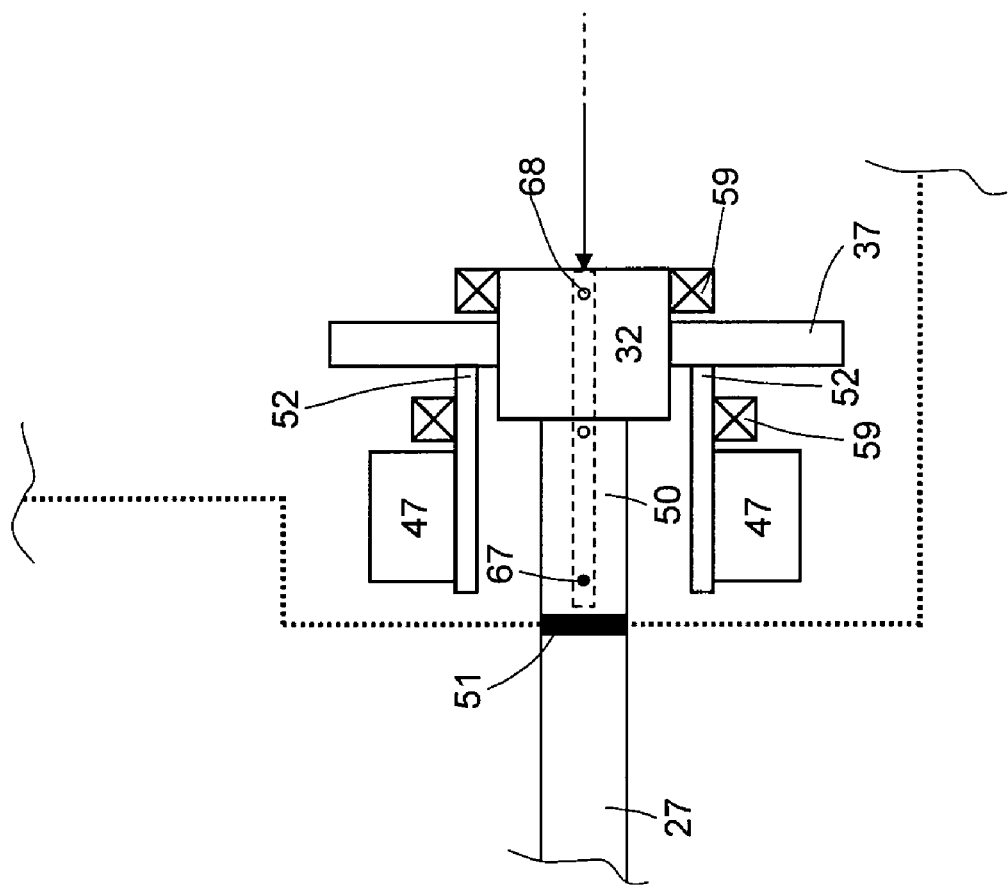
FIG. 7 is a diagrammatic view of a further part of a cooling and lubrication circuit in FIG. 6.
Figure 8:
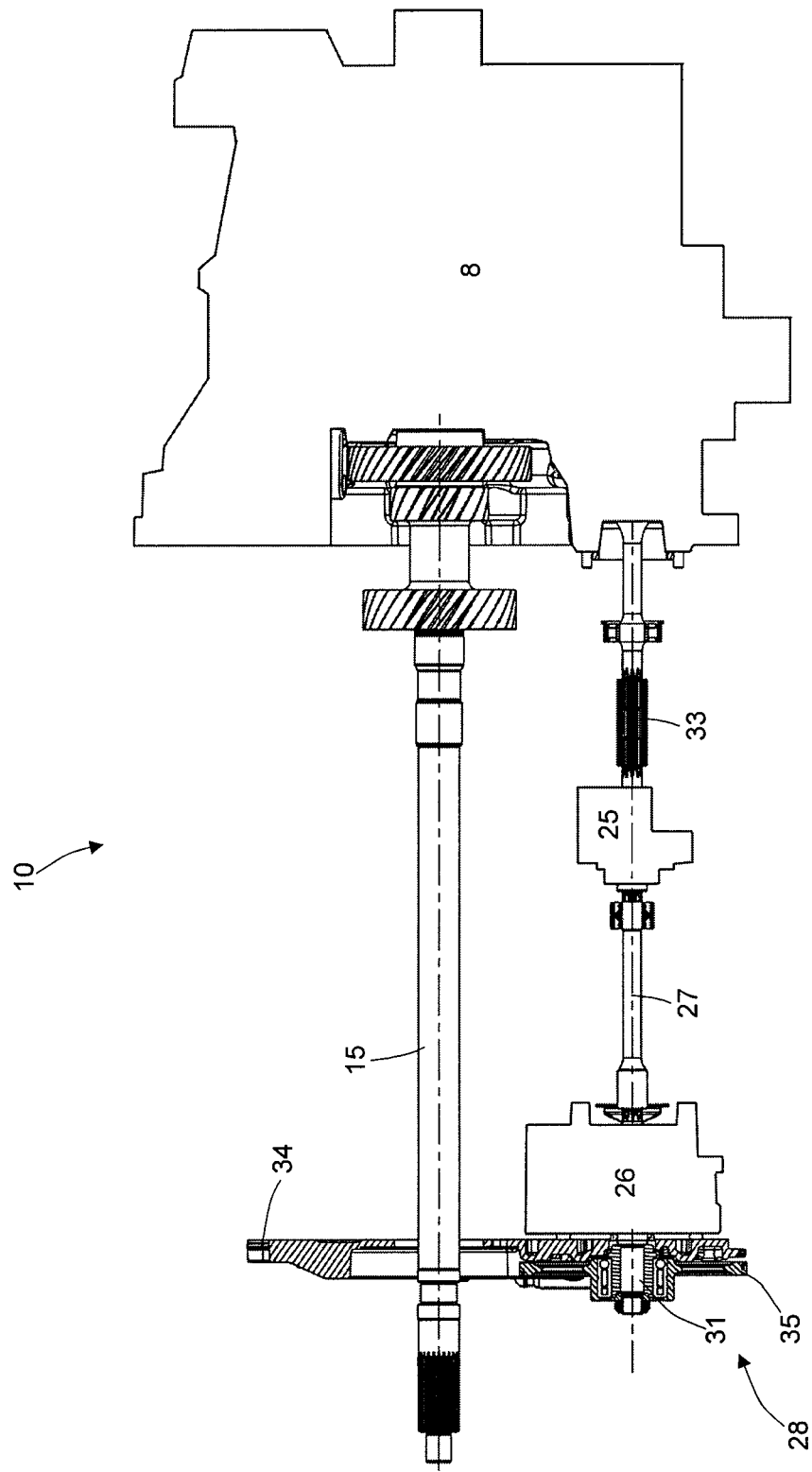
FIG. 8 is a diagrammatic section view with parts removed for clarity of an activating shaft of the transmission in FIG. 4.
Figure 9:
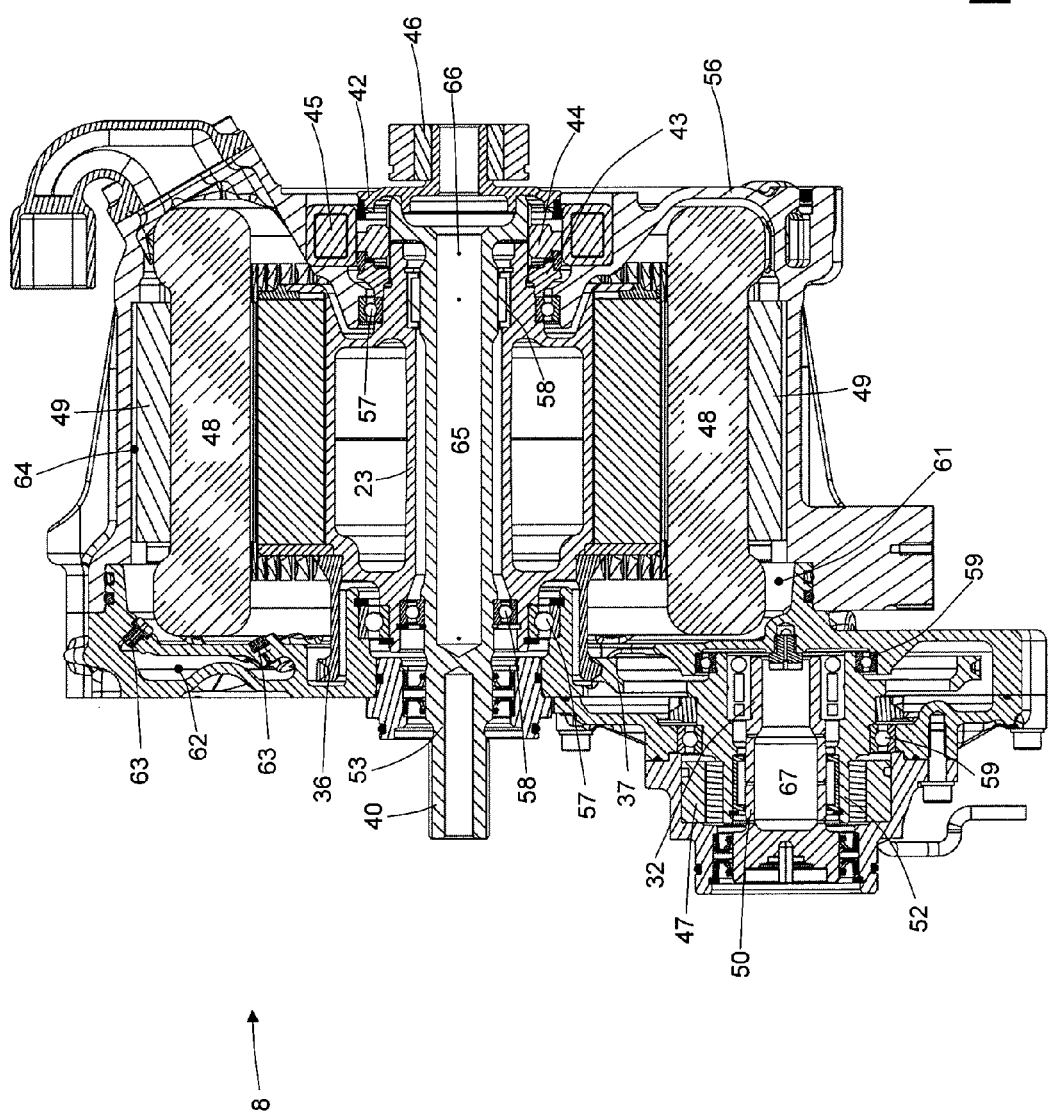
FIGS. 9 and 10 show two different, diagrammatic sections views, with parts removed for clarity, of the electric machine in FIG. 5.
Figure 10:
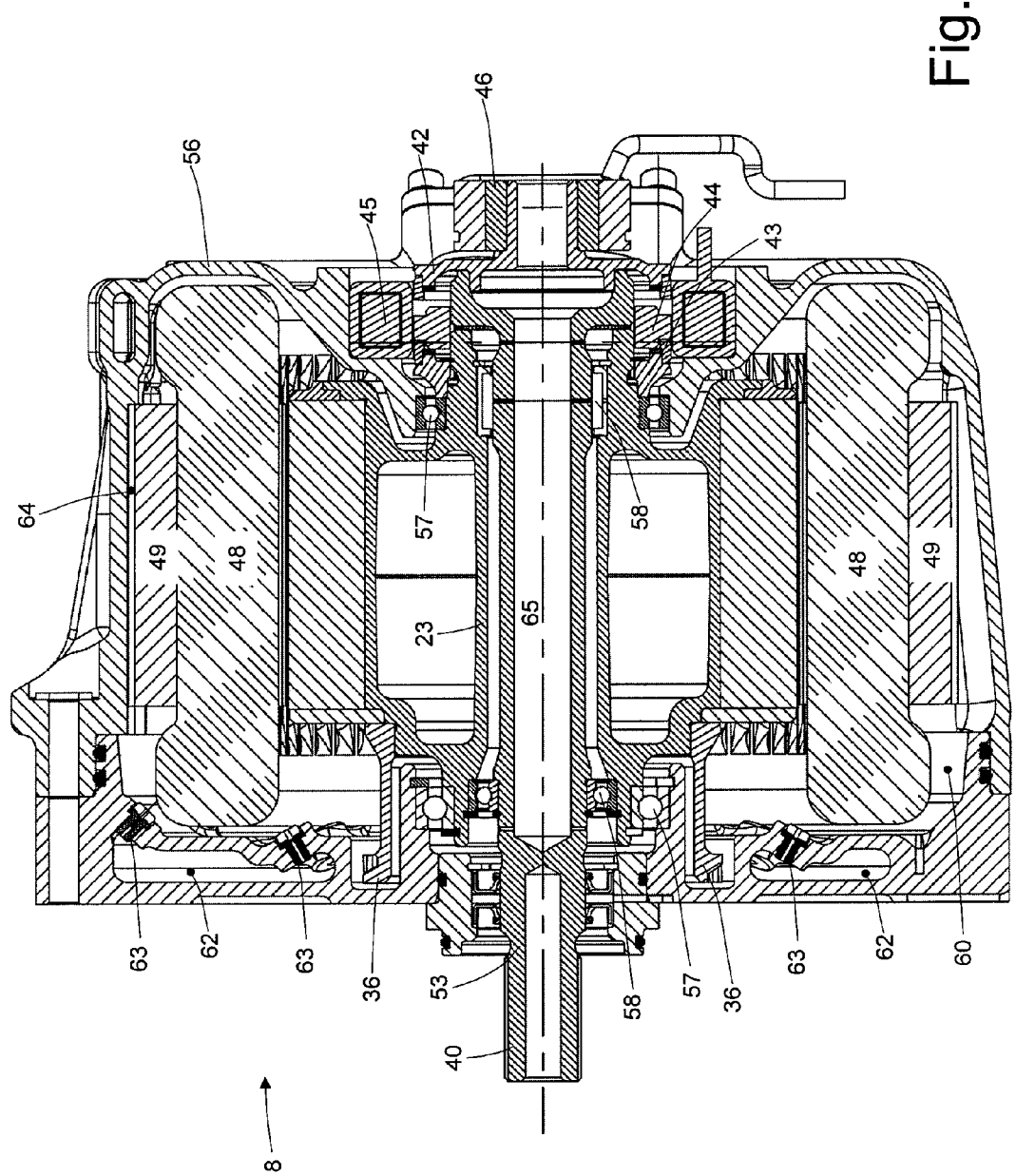

As shown in FIG. 7, the cooling and lubrication circuit 55 comprises a distribution channel 67, which is similar to the distribution channel 65 and is obtained in central position inside the connecting shaft 50. The distribution channel 67 has a central oil inlet opening 60 on one end of the connecting shaft 40 and a plurality of outlet holes 68, which are arranged radially and are obtained crossing the connecting shaft 50 to lead from the connecting shaft 50 itself at the bearings 59, the freewheel 32 and the gear 37.

As shown in FIG. 6, the cooling and lubrication circuit 55 comprises a radiator 69, typically of the air-oil type, by means of which the oil 60 is constantly cooled by a flow of air normally generated by the advancement of the car 1. The radiator 69 receives pressurized oil 60 from the circulation pump 54, which in turn draws oil 60 from the bottom of the collection sump 61; from an outlet of the radiator 69, the pressurized oil 60 is fed to an annular feeding chamber, to the distribution channel 64 of the connecting shaft 40, and to the distribution channel 67 of the connecting shaft 50.

The operation of the cooling and lubrication circuit 55 is described with reference to FIGS. 6 and 7. In use, the circulation pump 54 draws oil 60 from the bottom of the collection sump 61 and feeds the pressurized oil 60 through the radiator 69, and thus to the annular cooling chamber 62, to the distribution channel 64 of the connecting shaft 40, and to the distribution channel 67 of the connecting shaft 50.

The oil 60 reaching the inside of the cooling chamber 62, serves the function of cooling the zone (and thus removing heat from this zone) to avoid the heat from gearbox 10 from overheating the electric machine 8. In other words, the heat from gearbox 10 is "shielded" by the cooling chamber 62 (which, as previously mentioned, is arranged between the gearbox 10 and the electric machine 8) to avoid the heat from reaching the electric machine 8. Furthermore, the oil 60 which reaches the cooling chamber 62 is sprayed by the cooling nozzles 63 towards the stator 49 of the electric machine 8 (and therefore, inevitably, also towards the rotor 48, which is arranged close to the stator 49) to directly cool down the stator 49 (and also the rotor 48); to increase and uniform the cooling of the stator 49, the oil 60 which is sprayed by the cooling nozzles 63 towards the stator 49 partially also flows along the axial cooling channel 64.

It is worth noting that the cooling nozzles 63 are mainly concentrated in an upper portion of the cooling chamber 62 (indicatively in an upper half of the cooling chamber 62), because the lower part of the stator 49 is immersed in the oil bath 60 contained in the collection sump 61; furthermore, the oil 60 which is sprayed by the cooling nozzles 63 of the upper portion of the cooling chamber 62 descends (i.e. goes towards the collection sump 61) by gravity and thus continuously invests the lower portion of the stator 49 (and thus, inevitably also the rotor 48, which is arranged close to the stator 49).

According to the embodiment shown in FIG. 6, a single annular cooling chamber 62 is provided arranged by the side of the stator 49 of the electric machine 8 in the side of the stator 49 facing the gearbox 10 (as previously mentioned, the main function of the cooling chamber is to "shield" the heat coming from gearbox 10). According to a different embodiment (not shown), two symmetrically identical annular cooling chambers 62 (i.e. both provided with respective cooling nozzles 63, arranged on opposite sides of the stator 49) are provided.

The pressurized oil 60, which is fed into the distribution channels 65 and 67 of the connecting shafts 40 and 50, exits from the output holes 66 and 68 by its own pressure, and by centrifuge effect and thus lubricates the bearings 57, 58 and 59, the connecting device 38, the gears 36 and 37 and the freewheel 32. In this manner, all rotating mechanical parts are lubricated with oil guaranteeing a lubrication which is better and, above all, constant over time (on the contrary, a grease lubrication looses efficacy over time due to the progressive aging of the grease, which tends to dry up): therefore, the above-described electric machine has a very long working life, without need for maintenance interventions (except for possibly changing the oil 60, which is a simple, quick operation).

Figure 11:
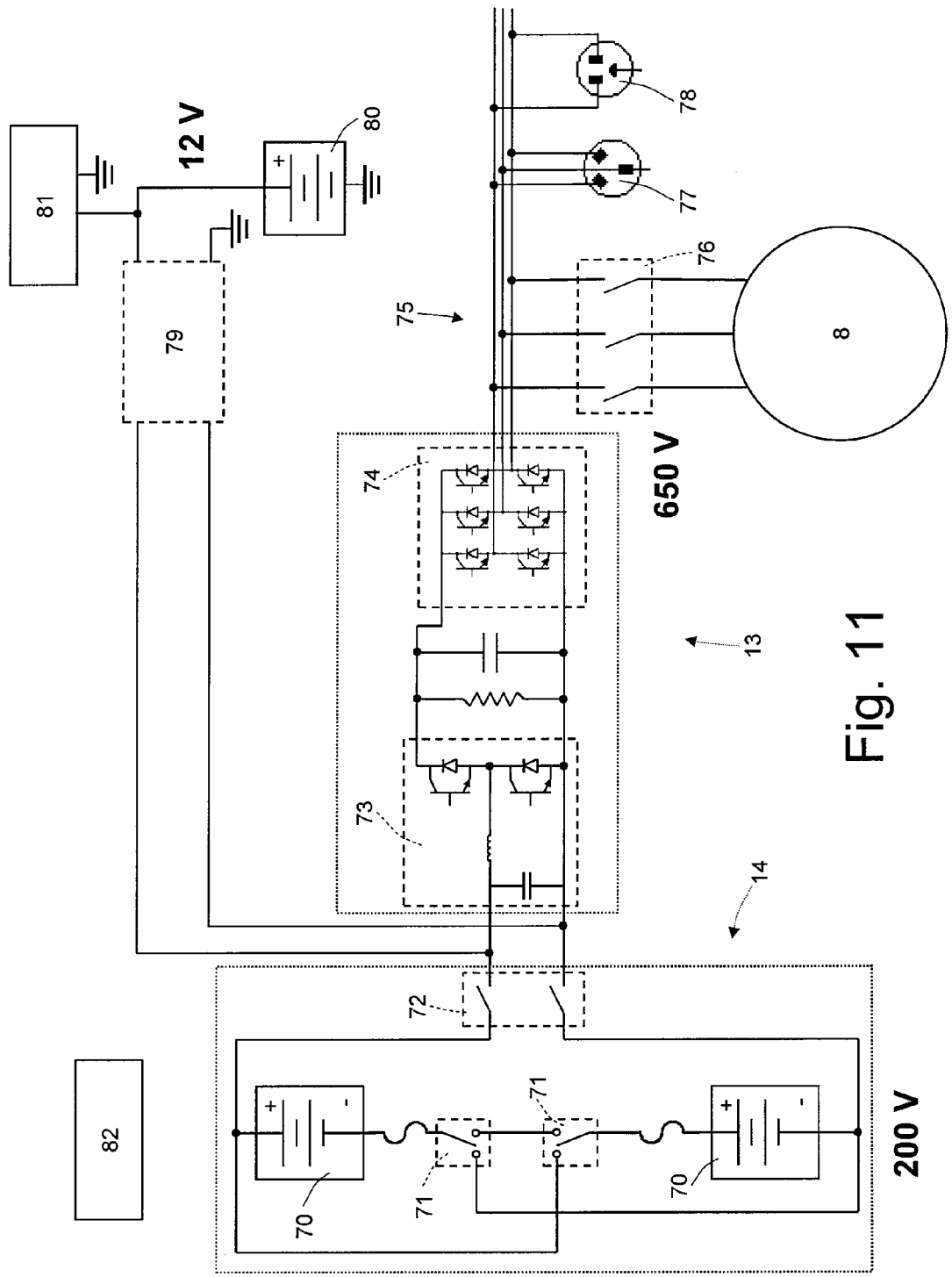
FIG. 11 is a diagram of an electric power circuit of the electric propulsion of the road vehicle in FIG. 1.

As shown in FIG. 11, the storage system 14 comprises two reciprocal twin, independent battery arrays 70, which are connected to one another in series. Furthermore, the storage system 14 comprises, for each battery array 70, a respective electronic or electromechanical bypass switch 71, which is connected in parallel to the battery array 70 to form a bypass in the battery array 70; in case of failure to a battery array 70, the battery array 70 itself is cut off by closing the respective bypass switch 71 and the storage system 14 continues to work with the other battery array 70 only.

The storage system 14 is connected to the electronic power converter 13 by means of an electronic or electromagnetic bipolar switch 72. The electronic power converter 13 is provided with a two-way DC-DC converter of the "Buck-Boost" type, which serves the function of modifying the voltage to electrically connect the storage system 14, which works at medium voltage (typically 200 Volts when both battery arrays 70 are operative) and the electronic power converter 13 that works at high voltage (typically 650 Volts). Furthermore, the electronic power converter 13 comprises a three-phase inverter 74, which on direct current side is connected to the two-way converter 73 and on the alternating current side is connected to the three-phase bars 75. A capacitor is connected in parallel between converter 73 and inverter 74 serving the function of reducing the voltage oscillations, as well as a (high value) resistor serving the function of discharging the capacitor when the circuit is not used, to avoid voltages remaining in the circuit for a long time which could be dangerous for possible technicians carrying out maintenance/repair operations.

The electric machine 8 is connected to the three-phase bars 75 by means of an electronic or electromechanical three-phase switch 76. Furthermore, the three-phase bars 75 are connected to a three-phase connector 77 (i.e. provided with three terminals connected to the three three-phase bars 75 respectively) and a one-phase connector 78 (i.e. provided with two terminals connected to one two of the three three-phase bars 75, respectively).

The storage system 14 is also connected to a one-way DC-DC converter 79 of the "Buck" type, which also serves the function of supplying a 12 Volt output voltage. The output of the one-way conveyor 79 is connected to a battery of the vehicle 1 and thus an electric system 81 of the vehicle 1 running at 12 Volt. The one-way converter 79 can supply the energy necessary for operation to the electric system 81 of the vehicle 1 and keeps the battery 80 of the vehicle 1 charged.

A control unit 82 is provided, with serves the function of superintending the operation of all electric systems by controlling the bypass switches 71 and the separation switches 72 and 76, driving the converters 73 and 79, and driving inverter 74.

Normally, both battery arrays 70 are active and reciprocally connected in series to output a voltage of 200 Volts from the storage system 14 (each battery array 70 has at its terminal a voltage of 100 Volt). In case of fault in a battery array 70, the battery array 70 itself is cut off by closing the bypass respective switch 71 and the direct storage system 14 keeps working only with the other battery array 70; therefore, a voltage which is half nominal value (100 Volt instead of 200 Volt) is output from storage system 14 and such halving of the voltage is compensated by appropriately driving the converters 73 and 79 so that the nominal voltage equal to 650 Volt is always present at converter output 73 and the nominal voltage of 12 Volt is always present at the converter output 79.

When vehicle 1 is running, the separation switch 76 is closed so that the inverter 74 may drive the electric machine 8 either as a motor or as a generator.

When vehicle 1 is stationary, the separation switch 76 is open and the storage system 14 may be recharged by connecting the three-phase bars 75 to the electric network either by means of the three-phase connector 77 or by means of a one-phase connector 78; when the three-phase connector 77 is used, all three branches of inverter 74 are active, while when the one-phase connector 78 is used, only two out of three branches of inverter 74 are active. While recharging from the electric mains, inverter 74 and converter 73 are driven so that the input mains alternating voltage (normally 220 V between phase and ground and 380 Volt between two phases) is transformed into direct voltage (200 Volts) at the ends of the storage system 15 (100 Volts, if one of the two battery arrays 70 has been cut off by the respective bypass switch 71).

The invention claimed is:

1. A transmission for a road vehicle with hybrid propulsion; the transmission comprising:

a gearbox with at least one primary shaft, at least one secondary shaft and at least one pump configured to be actuated by an activating shaft;

at least one clutch connected to the primary shaft and including a part which is normally transmissive and which is configured to be connected to a drive shaft of a thermal engine;

at least one reversible electric machine having a shaft which is mechanically connectable to the primary shaft;

a first mechanical transmission to transmit the motion from the normally transmissive part of the clutch to the activating shaft with the first mechanical transmission including a first freewheel to transmit the motion only when it rotates in a first rotation direction; and a second mechanical transmission which is connected mechanically to the shaft of the electric machine, transmits the motion from the shaft of the electric machine to the activating shaft with the first mechanical transmission including a second freewheel to transmit the motion only when it rotates in a second rotation direction which is opposite to the first rotation direction of the first freewheel;

wherein the transmission comprises a connecting device which is electrically controllable to mechanically connect the shaft of the electric machine to the primary shaft of the gearbox and which is electronically controllable to connect or disconnect the shaft of the at least one reviersible electric machine and the at least one primary shaft.

2. A transmission according to claim 1, wherein the connecting device is located downstream of the second mechanical transmission relative to the electric machine.

3. A transmission according to claim 1,
wherein the shaft of the electric machine has a tubular shape and has a central passing cavity;
wherein inside the central passing cavity of the shaft of the electric machine a first connecting shaft is located;
wherein the first connecting shaft is an extension of the primary shaft of the gearbox to which it is joined via a butt joint;
wherein the first connecting shaft crosses side to side the whole shaft of the electric machine and on the part opposite to the primary shaft it is configured to connect to the shaft of the electric machine through the connecting device.

4. A transmission according to claim 3, wherein the connecting device comprises a gear with straight teeth united to the first connecting shaft, a gear with straight teeth united to the shaft of the electric machine, placed parallel and facing the gear, a movable toothed sleeve mounted axially, and an electromagnetic actuating device that is aimed at axially moving the sleeve between a decoupling position and a coupling position, in which the sleeve (44) is configured to engage with both the first and second gears so as to make the first and second gears themselves united angularly with each other.

5. A transmission according to claim 4 and comprising a first encoder configured to detect in real time the angular position of the first connecting shaft and a second encoder configured to detect in real time the angular position of the shaft of the electric machine;
wherein the electric machine is configured to use the measurements of the two encoders of the electric machine to electrically control the electric machine to synchronize the rotation of the first and second gears of the connecting device.

6. A transmission according to claim 3, comprising a second connecting shaft which on one side is connected to the second freewheel and on the other side is joined via a butt joint to the activating shaft.

7. A transmission according to claim 6 comprising an Oldham joint linking together the second connecting shaft and the activating shaft, to allow some misalignment between the two shafts themselves.

8. A transmission according to claim 3,
wherein the second mechanical transmission includes a cascade of gears and comprises a third gear connected to the shaft of the electric machine and a fourth gear to engage with the third gear and which is connected to the activating shaft;
wherein a rotor of the electric machine is configured to directly support the third gear of the second mechanical transmission which is cup-shaped, protrudes cantilevered from one side of the rotor, and has external teeth to mesh with the teeth of the fourth gear.

9. A transmission according to claim 8, wherein a crown of the third gear supports a cup-shaped element protruding cantilevered from one side of the third gear itself and is coupled to a second encoder configured to detect in real time the angular position of the shaft of the electric machine.

10. A transmission according to claim 8 and comprising a cooling and lubrication circuit to cool and lubricate the electric machine, the circuit configured to circulate the oil , the circuit including a circulation pump configured to receive the motion from the third gear.

11. A transmission according to claim 3, wherein the first connecting shaft has a weakened area (53) configured to break, determining a controlled fracture in the event of excessive overload.

12. A transmission according to claim 3, comprising a box of the electric machine which houses inside the electrical machine, the first connecting shaft, the connecting device, and the second mechanical transmission; the box of the electric machine separable and independent from a box of the gearbox and attached to the box of the gearbox to form one unity with the box of the gearbox.

13. A transmission according to claim 1 and comprising a cooling and lubrication circuit to cool and lubricate the electric machine, the cooling and lubrication circuit being configured to circulate the oil, and the cooling and lubrication circuit comprising an annular cooling chamber to receive the oil under pressure and which is placed next to a stator of the electric machine on the side of the stator facing the gearbox.

14. A transmission according to claim 1, wherein the gear ratio determined by the first mechanical transmission is higher than the gear ratio determined by the second mechanical transmission, so that, given an equal input speed, the first mechanical transmission is configured to make the activating shaft rotate faster than the second mechanical transmission does.

15. A transmission according to claim 1, wherein the transmission comprises a disengagement sleeve, which is located along the activating shaft and upstream of the second mechanical transmission and is configured to allow the portion of the activating shaft arranged on the right of the disengagement sleeve to slide axially with respect to the portion of the activating shaft arranged on the left of the disengagement sleeve.

16. A transmission according to claim 1, wherein the second mechanical transmission consists of a cascade of gears and comprises a third gear, connected to the shaft of the electric machine, and a fourth gear to mesh with the third gear and is connected to the activating shaft.

17. A transmission according to claim 16, wherein a rotor of the electric machine is configured to directly support the third gear of the second mechanical transmission; wherein the third gear is cup shaped, protrudes swing from one side of the rotor and has external teeth so as to mesh with the teeth of the fourth gear.

* * * * *